(12) United States Patent
Kainuma et al.

(10) Patent No.: US 12,466,011 B1
(45) Date of Patent: Nov. 11, 2025

(54) METHOD OF ASSEMBLING A BELT CONVEYANCE APPARATUS (71) Applicant: KYOCERA Document Solutions Inc., Osaka (JP)

(72) Inventors: Takashi Kainuma, Osaka (JP); Kazuhisa Hirahara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/054,417

(22) Filed: Feb. 14, 2025

(30) Foreign Application Priority Data

Feb. 26, 2024 (JP) .................... 2024-026520

(51) Int. Cl.
| | | |
|---|---|---|
| *B23P 11/00* | (2006.01) | |
| *G03G 15/01* | (2006.01) | |
| *G03G 15/16* | (2006.01) | |
| *G03G 21/16* | (2006.01) | |

(52) U.S. Cl.
CPC .......... *B23P 11/00* (2013.01); *G03G 15/0136* (2013.01); *G03G 15/16* (2013.01); *G03G 21/16* (2013.01); *G03G 21/1647* (2013.01); *G03G 2221/1603* (2013.01); *G03G 2221/1642* (2013.01); *G03G 2221/1651* (2013.01)

(58) Field of Classification Search
CPC ........... G03G 15/0131; G03G 15/0189; G03G 15/16; G03G 21/16; G03G 21/1647; G03G 21/168; G03G 2221/1603; G03G 2221/1642; G03G 2221/1651; B23P 11/00; B23P 15/00
See application file for complete search history.

(56) References Cited

U.S. PATENT DOCUMENTS

| | | | |
|---|---|---|---|
| 2018/0024472 A1* | 1/2018 | Sato | G03G 15/1605 399/121 |
| 2018/0284657 A1* | 10/2018 | Tokoro | G03G 15/0131 |
| 2019/0041774 A1* | 2/2019 | Nakajima | G03G 15/0189 |

FOREIGN PATENT DOCUMENTS

| | | | |
|---|---|---|---|
| JP | 2010002872 A | * | 1/2010 |
| JP | 2011013608 A | * | 1/2011 |
| JP | 2012-159571 A | | 8/2012 |

* cited by examiner

*Primary Examiner* — Matthew P Travers
(74) *Attorney, Agent, or Firm* — Stein IP, LLC (57) ABSTRACT

A method of assembling a belt conveyance apparatus having an endless belt, a plurality of rollers, a frame, a bearing holder, an urging member, a slider, and a driving gear includes the steps of: in a state without the driving gear mounted to the frame, arranging the slider in a disengaged position; attaching the bearing holder and the urging member to the frame; moving the slider in an engaged position so that it engages with the bearing holder; and attaching the driving gear to the frame so that it meshes with the slider arranged in the engaged position.

4 Claims, 6 Drawing Sheets

METHOD OF ASSEMBLING A BELT CONVEYANCE APPARATUS

INCORPORATION BY REFERENCE

This application is based on and claims the benefit of priority from Japanese Patent Application No. 2024-026520 filed on Feb. 26, 2024, the contents of which are hereby incorporated by reference.

BACKGROUND

The present disclosure relates to a method of assembling a belt conveyance apparatus.

As electrophotographic image forming apparatuses such as copiers and printers, intermediate transfer-type image forming apparatuses are known which primarily transfer to an endless intermediate transfer belt arranged along the array direction of a plurality of photosensitive drums (image carrying members) toner images of different colors formed on the outer circumferential surfaces of the plurality of photosensitive drums while sequentially overlaying them on each other and which then secondarily transfer the toner images to a sheet or the like (recording medium).

SUMMARY

The present disclosure is directed to, as one aspect of it, a method of assembling a belt conveyance apparatus that includes an endless belt, a plurality of rollers, a frame, a bearing holder, an urging member, a slider, and a driving gear. The plurality of rollers include a stretching roller around which the belt is rotatably stretched. The frame rotatably supports the plurality of rollers. The bearing holder provided on the frame rotatably supports at least one of the plurality of rollers, and is movable in the contact-release direction toward and away from the inner circumferential surface of the belt. The urging member urges the bearing holder in such a direction that the roller supported on the bearing holder moves toward the inner circumferential surface of the belt. The slider is supported on the frame so as to be reciprocably movable along the orthogonal direction orthogonal to the axial direction of the roller and engages with the bearing holder to move the bearing holder in the contact-release direction. The driving gear is rotatably supported on the frame and meshes with the slider to make the slider move reciprocably. The slider is arranged selectively in a disengaged position where the slider is disengaged from the bearing holder or in an engaged position where the slider is engaged with the bearing holder. The method of assembling the belt conveyance apparatus includes a step of, in a state without the driving gear attached to the frame, arranging the slider in the disengaged position, a step of attaching the bearing holder and the urging member to the frame, a step of moving the slider to the engaged position so that it engages with the bearing holder, and a step of attaching the driving gear to the frame so that it meshes with the slider arranged in the engaged position.

DETAILED DESCRIPTION

An embodiment of the present disclosure will be described below with reference to the accompanying drawings. The present disclosure is not limited to what is specifically described below.

Figure 1:
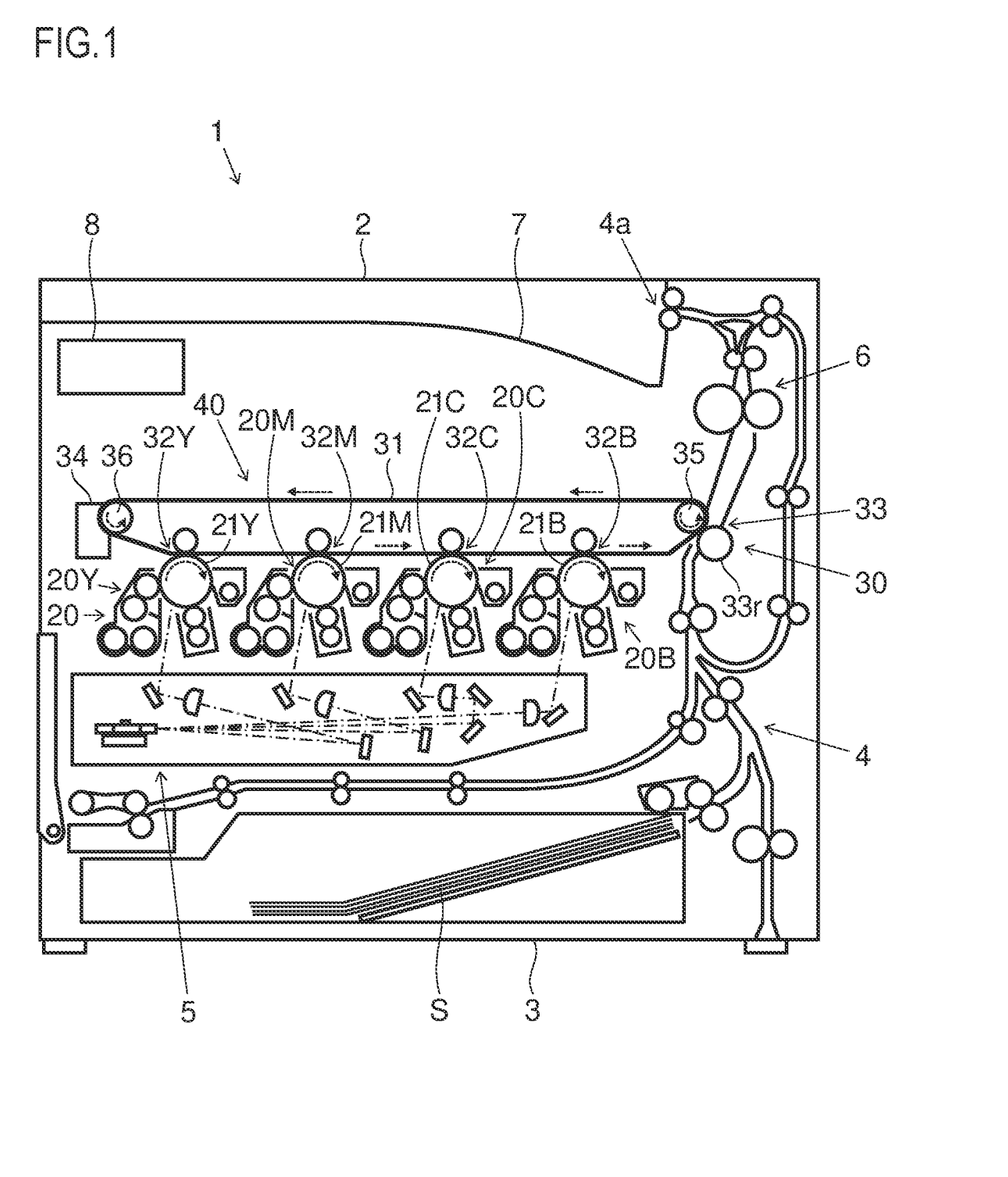
FIG. 1 is a schematic sectional front view of an image forming apparatus according to one embodiment of the present disclosure.

FIG. 1 is a schematic sectional front view of an image forming apparatus 1 of the embodiment. One example of the image forming apparatus 1 of the embodiment is a tandem-type color printer that transfers a toner image to a sheet S by using an intermediate transfer belt 31. The image forming apparatus 1 can be what is called a multifunction peripheral that has functions of, for example, printing, scanning (image reading), and facsimile transmission.

As shown in FIG. 1, the image forming apparatus 1 includes, in an apparatus main body 2, a sheet feeding portion 3, a sheet conveyance device 4, an exposure portion 5, an image forming portion 20, a transfer portion 30, a fixing portion 6, a sheet discharging portion 7, and a control portion 8.

The sheet feeding portion 3 is arranged in a bottom part of the apparatus main body 2. The sheet feeding portion 3 stores a plurality of unprinted sheets S and feeds out the sheets S one by one during printing. The sheet conveyance device 4 extends along a side wall of the apparatus main body 2 in the up-down direction. The sheet conveyance device 4 conveys the sheet S fed out from the sheet feeding portion 3 to a secondary transfer portion 33 and then to the fixing portion 6, and after that, discharges the sheet S after fixing through a discharging port 4a to the sheet discharging portion 7. The exposure portion 5 is arranged above the sheet feeding portion 3. The exposure portion 5 irradiates the image forming portion 20 with laser light controlled based on image data.

The image forming portion 20 is arranged above the exposure portion 5, below the intermediate transfer belt 31. The image forming portion 20 includes an image forming portion 20Y for yellow, an image forming portion 20C for cyan, an image forming portion 20M for magenta, and an image forming portion 20B for black. These four image forming portions 20 basically have the same structure. Therefore, in the following description, unless distinction is required, the suffixes "Y", "C", "M", and "B" distinguishing different colors may be omitted.

The image forming portion 20 includes a photosensitive drum (image carrying member) 21 that is supported so as to be rotatable in a predetermined direction (clockwise in FIG. 1). The image forming portion 20 further includes, arranged around the photosensitive drum 21 along its rotation direction, a charging portion, a development portion, and a drum cleaning portion. A primary transfer portion 32 is arranged between the development portion and the drum cleaning portion.

The photosensitive drum 21 is formed in a cylindrical shape extending in the horizontal direction and has a photosensitive layer on its outer circumferential surface. The charging portion electrostatically charges the outer circumferential surface of the photosensitive drum 21 to a predetermined surface potential. The exposure portion 5 exposes to light the outer circumferential surface of the photosensitive drum 21 electrostatically charged by the charging portion and forms an electrostatic latent image of a document image by attenuating electric charge on the outer circumferential surface of the photosensitive drum 21. The development portion feeds toner to the electrostatic latent image on the outer circumferential surface of the photosensitive drum 21 to develop it to form a toner image. The four image forming portions 20 form toner images of different colors. The drum cleaning portion removes and collects toner and other deposit that, after the toner image is primarily transferred to the outer circumferential surface of the intermediate transfer belt 31, remains on the outer circumferential surface of the photosensitive drum 21. In this way, the image forming portion 20 forms an image (toner image) to be later transferred to the sheet S.

The transfer portion 30 includes the intermediate transfer belt 31, the primary transfer portions 32Y, 32C, 32M, and 32B, the secondary transfer portion 33, and the belt cleaning portion 34. The intermediate transfer belt 31 is arranged above the four image forming portions 20. The intermediate transfer belt 31 is supported so as to be rotatable in a predetermined direction (counterclockwise in FIG. 1) and is an endless intermediate transferring member to which the toner images formed on the four image forming portions 20 are primarily transferred while being sequentially overlaid on each other. The four image forming portions 20 are arranged in what is called a tandem formation in which they are lined up in a row from upstream to downstream in the rotation direction of the intermediate transfer belt 31.

The primary transfer portions 32Y, 32C, 32M, and 32B are arranged above the image forming portions 20Y, 20C, 20M, and 20B across the intermediate transfer belt 31. The secondary transfer portion 33 is arranged upstream of the fixing portion 6 with respect to the sheet conveyance direction of the sheet conveyance device 4, downstream of the four image forming portions 20Y, 20C, 20M, and 20B with respect to the rotation direction of the intermediate transfer belt 31. The belt cleaning portion 34 is arranged downstream of the secondary transfer portion 33 with respect to the rotation direction of the intermediate transfer belt 31.

The primary transfer portion 32 transfers the toner image formed on the outer circumferential surface of the photosensitive drum 21 to the intermediate transfer belt 31. In other words, the toner image is primarily transferred to the outer circumferential surface of the intermediate transfer belt 31 in the primary transfer portions 32Y, 32C, 32M, and 32B for different colors. As the intermediate transfer belt 31 rotates, the toner images in the four image forming portions 20 are sequentially transferred to the intermediate transfer belt 31 so as to be overlaid on each other with predetermined timing so that, a color toner image is formed in which the toner images of four colors, namely yellow, cyan, magenta, and black, are overlaid on each other.

The color toner image on the outer circumferential surface of the intermediate transfer belt 31 is transferred to the sheet S conveyed synchronously by the sheet conveyance device 4 in a secondary transfer nip portion formed in the secondary transfer portion 33. The belt cleaning portion 34, after secondary transfer, cleans the outer circumferential surface of the intermediate transfer belt 31 by removing toner and other deposit remaining on it. In this way, the transfer portion 30 transfers (records) the toner image formed on the outer circumferential surface of the photosensitive drum 21 to the sheet S.

The fixing portion 6 is arranged downstream of the secondary transfer portion 33 with respect to the sheet conveyance direction, above the secondary transfer portion 33. The fixing portion 6 heats and presses the sheet S having the toner image transferred to it to fix the toner image to the sheet S.

The sheet discharging portion 7 is arranged above the transfer portion 30. The sheet S having the toner image fixed to it and having undergone printing is conveyed to the sheet discharging portion 7. In the sheet discharging portion 7, the printed sheet (printed matter) is taken out from above.

The control portion 8 includes a CPU, an image processing portion, a storage portion, and other electronic circuits and electronic components (none is illustrated). The CPU controls the operation of different components in the image forming apparatus 1 and performs processing related to the functions of the image forming apparatus 1 based on control programs and data stored in the storage portion. The sheet feeding portion 3, the sheet conveyance device 4, the exposure portion 5, the image forming portion 20, the transfer portion 30, and the fixing portion 6 individually receive commands from the control portion 8 and cooperate to print on the sheet S. The storage portion is, for example, configured as a combination of a non-volatile storage device such as a program ROM (read-only memory) and a data ROM, and a volatile storage device such as a RAM (random-access memory).

Figure 2:
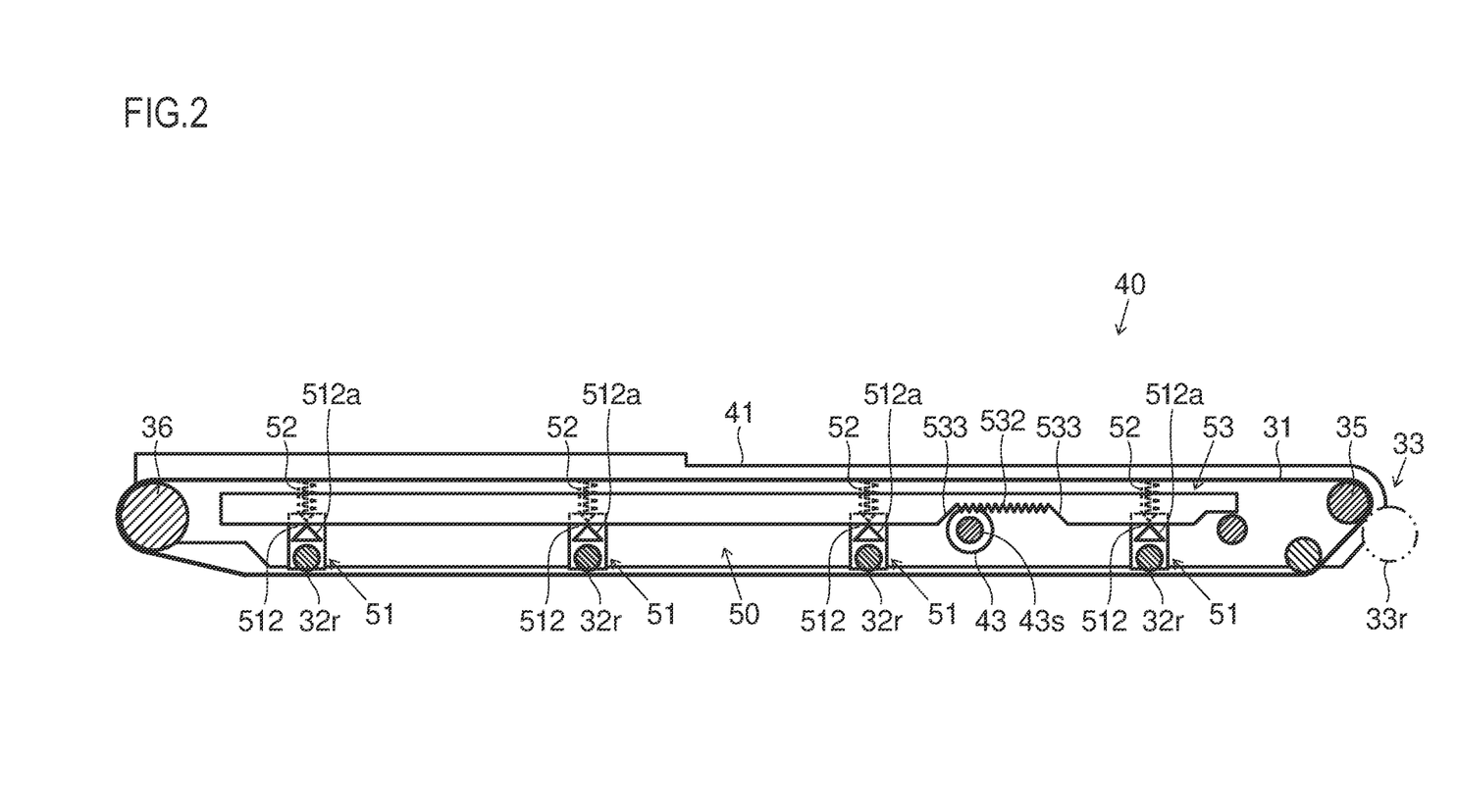
FIG. 2 is a sectional front view of a belt conveyance device in the image forming apparatus in FIG. 1.
Figure 3:
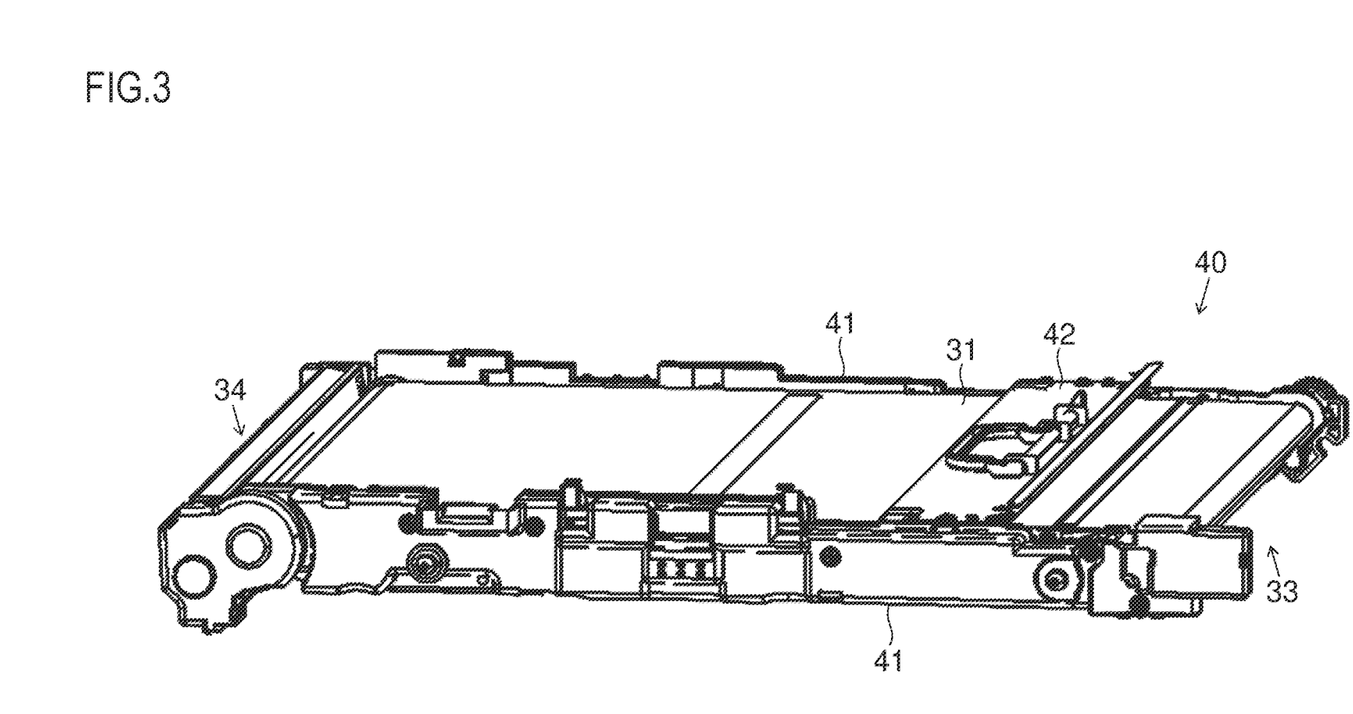
FIG. 3 is a perspective view of the belt conveyance device in the image forming apparatus in FIG. 1.
Figure 4:
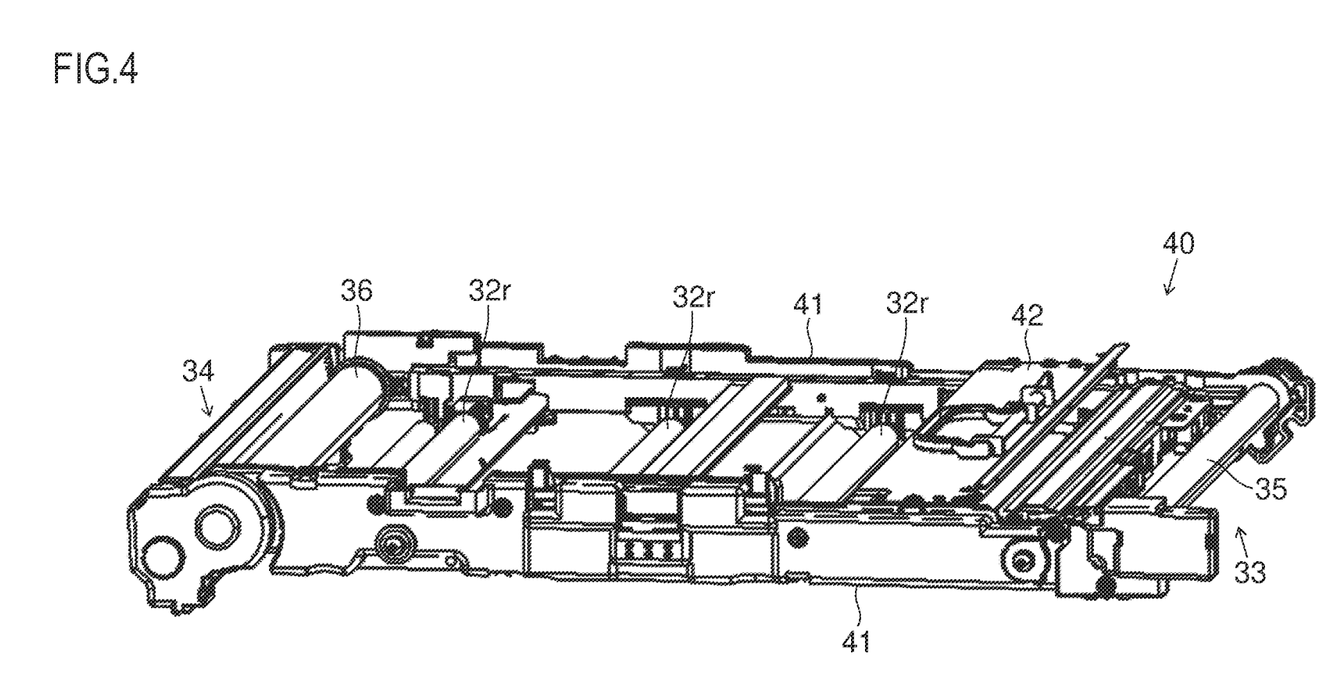
FIG. 4 is a perspective view of the belt conveyance device in the image forming apparatus in FIG. 1 with an intermediate transfer belt removed.

Next, the configuration of the transfer portion 30 will be described in detail. The transfer portion 30 includes a belt conveyance device 40 as shown in FIGS. 1, 2, and 3. FIG. 2 is a sectional front view of the belt conveyance device 40 in the image forming apparatus 1 in FIG. 1. FIGS. 3 and 4 are perspective views of the belt conveyance device 40 in the image forming apparatus 1 in FIG. 1, FIG. 4 showing it with the intermediate transfer belt 31 removed. FIG. 2 is a sectional front view of the belt conveyance device 40 as seen from a middle part of it rearward along the width direction of the intermediate transfer belt 31.

In this embodiment, the movement direction of the intermediate transfer belt 31 runs substantially parallel to the left-right, transverse direction of the image forming apparatus 1 (the left-right, transverse direction in FIGS. 1 and 2) and the width direction orthogonal to the movement direction of the intermediate transfer belt 31 runs parallel to the front-rear direction of the image forming apparatus 1 (the near-far direction with respect to the plane of FIGS. 1 and 2). The axial direction of the rotation of a plurality of stretching rollers including a driving roller 35 and a driven roller 36, a primary transfer roller 32r, and a secondary transfer roller 33r, which will be described later, runs parallel to the front-rear direction. The orthogonal direction orthogonal to the axial direction of those rollers is parallel to both the movement direction of the intermediate transfer belt 31 and the left-right, transverse direction of the image forming apparatus 1 (the left-right, longitudinal direction in FIGS. 1 and 2).

The belt conveyance device 40 includes a pair of side frames (frame) 41, a top plate 42, the intermediate transfer belt (belt) 31, the plurality of stretching rollers, four primary transfer rollers 32r, a primary contact-release mechanism 50, and a driving gear 43.

The pair of side frames 41 are arranged on the front and rear side faces of the belt conveyance device 40. The pair of side frames 41 extend along the up-down direction and the movement direction of the intermediate transfer belt 31, that is, the left-right, transverse direction in the image forming apparatus 1 in FIG. 1. The pair of side frames 41 are arranged at the opposite end parts of the plurality of stretching rollers in the axial direction. The pair of side frames 41 rotatably support the plurality of stretching rollers and the four primary transfer rollers 32r.

The top plate 42 extends substantially horizontally in the direction in which the pair of side frames 41 face each other, in the front-rear direction of the image forming apparatus 1. The top plate 42 is arranged between the pair of side frames 41 in the front-rear direction and are connected to the pair of side frames 41. That is, the pair of side frames 41 are arranged one at each end of the top plate 42 in the front-rear direction.

The intermediate transfer belt 31 is arranged along the four image forming portions 20. The intermediate transfer belt 31 is endless and is rotatably supported on the plurality of stretching rollers. The intermediate transfer belt 31 moves along the array direction of the four photosensitive drums 21. The outer circumferential surface of the intermediate transfer belt 31 makes contact with the four photosensitive drums 21 and with the secondary transfer roller 33r, which will be described later.

The plurality of stretching rollers are arranged between the pair of side frames 41 in the front-rear direction and their opposite end parts in the axial direction are rotatably supported on the pair of side frames 41. The plurality of stretching rollers make contact with the inner circumferential surface of the intermediate transfer belt 31 and the intermediate transfer belt 31 is rotatably stretched around them. In this embodiment, the plurality of stretching rollers include the driving roller 35 and the driven roller 36.

The driving roller 35 is arranged downstream of the image forming portions 20Y, 20M, 20C, and 20B for different colors in the rotation direction of the intermediate transfer belt 31. The driving roller 35 receives motive power from an unillustrated driving motor and rotates the intermediate transfer belt 31 counterclockwise in FIG. 2.

The driving roller 35 is arranged adjacent to the secondary transfer portion 33. In the secondary transfer portion 33 is arranged the secondary transfer roller 33r. The secondary transfer roller 33r is arranged at a position facing the driving roller 35 across the intermediate transfer belt 31 and makes contact with the outer circumferential surface of the intermediate transfer belt 31. In other words, the belt conveyance device 40 makes contact with the secondary transfer roller 33r. The secondary transfer roller 33r transfers the toner image on the intermediate transfer belt 31 to the sheet S.

The driven roller 36 is arranged upstream of the image forming portions 20Y, 20M, 20C, and 20B for different colors in the rotation direction of the intermediate transfer belt 31. As the intermediate transfer belt 31 rotates, the driven roller 36 rotates counterclockwise in FIG. 2 by following it. The driven roller 36 is urged in a direction away from the driving roller 35 (leftward in FIG. 2) by a tension spring (not illustrated). This gives the intermediate transfer belt 31 a predetermined tension.

The four primary transfer rollers 32r are arranged above the four image forming portions 20 across the intermediate transfer belt 31. The primary transfer rollers 32r are each arranged opposite the photosensitive drum 21 across the intermediate transfer belt 31 and make contact with the lower inner circumferential surface of the intermediate transfer belt 31. The primary transfer rollers 32r transfer to the intermediate transfer belt 31 the toner images formed on the outer circumferential surfaces of the four photosensitive drums 21 while sequentially overlaying them on each other.

Figure 5:
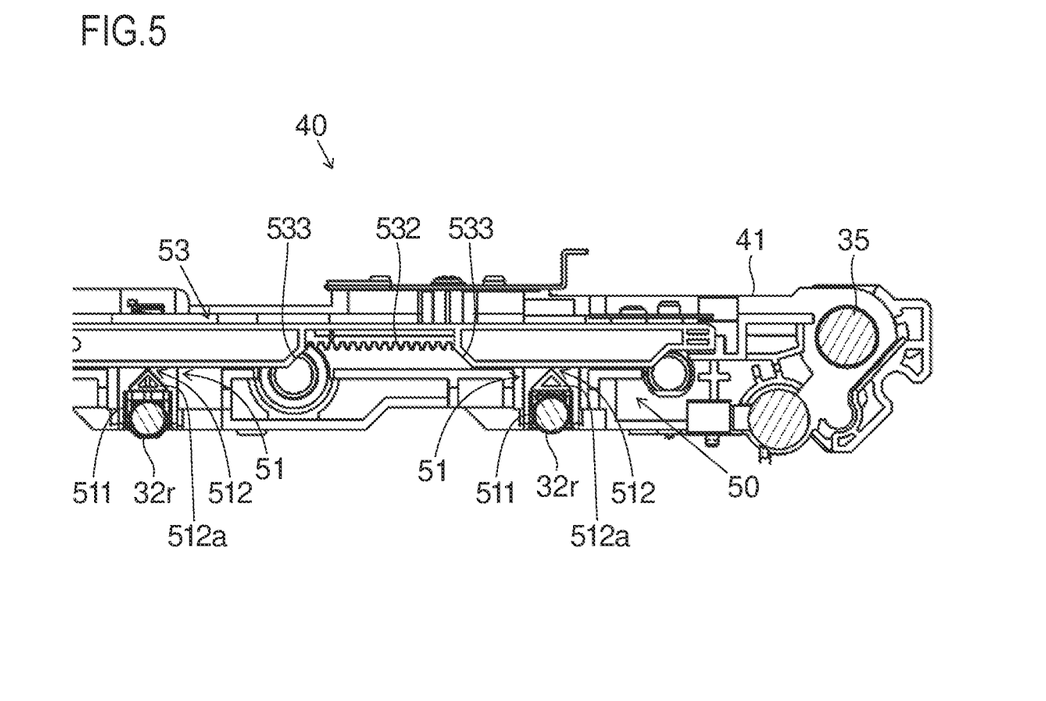
FIG. 5 is a sectional front part view of the belt conveyance device in FIG. 2, showing a slider in a position disengaged from a bearing holder.
Figure 6:
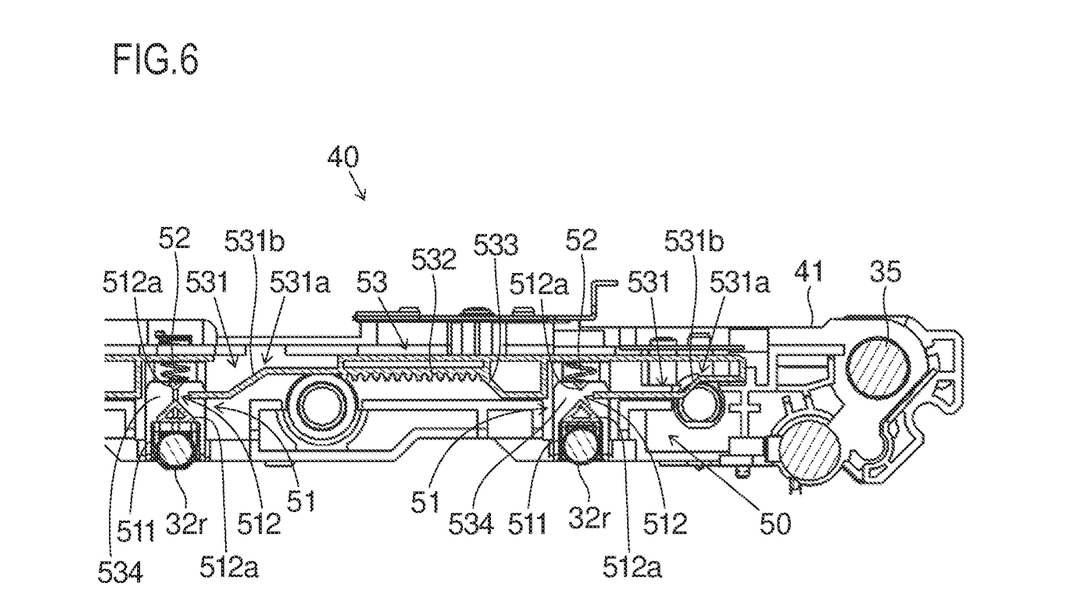
FIG. 6 is a sectional front part view of the belt conveyance device in FIG. 5, across a section of the slider.
Figure 7:
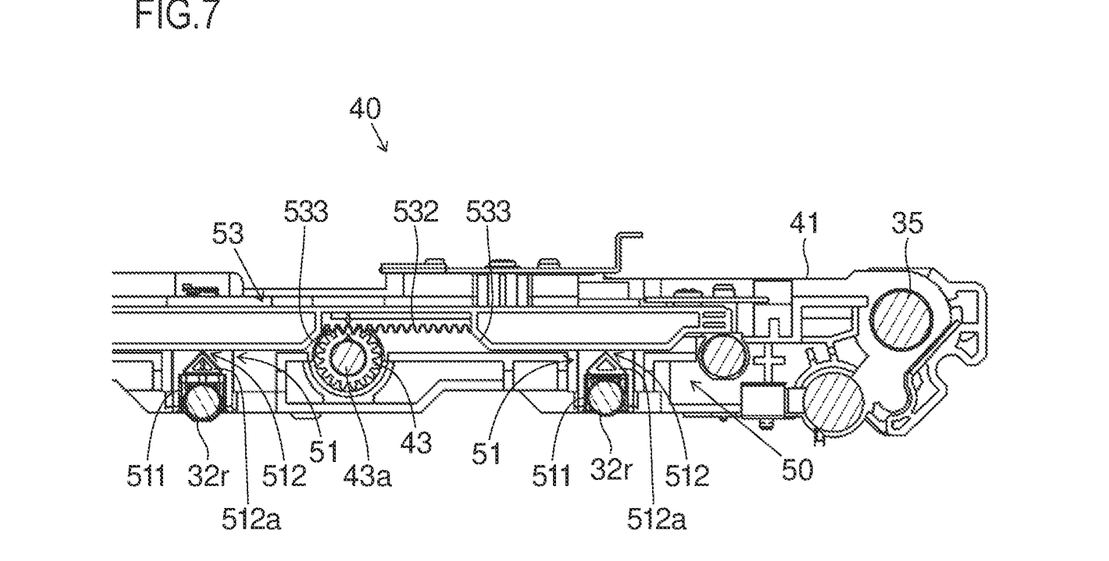
FIG. 7 is a sectional front part view of the belt conveyance device in FIG. 2, showing the slider in a position engaged with the bearing holder.
Figure 8:
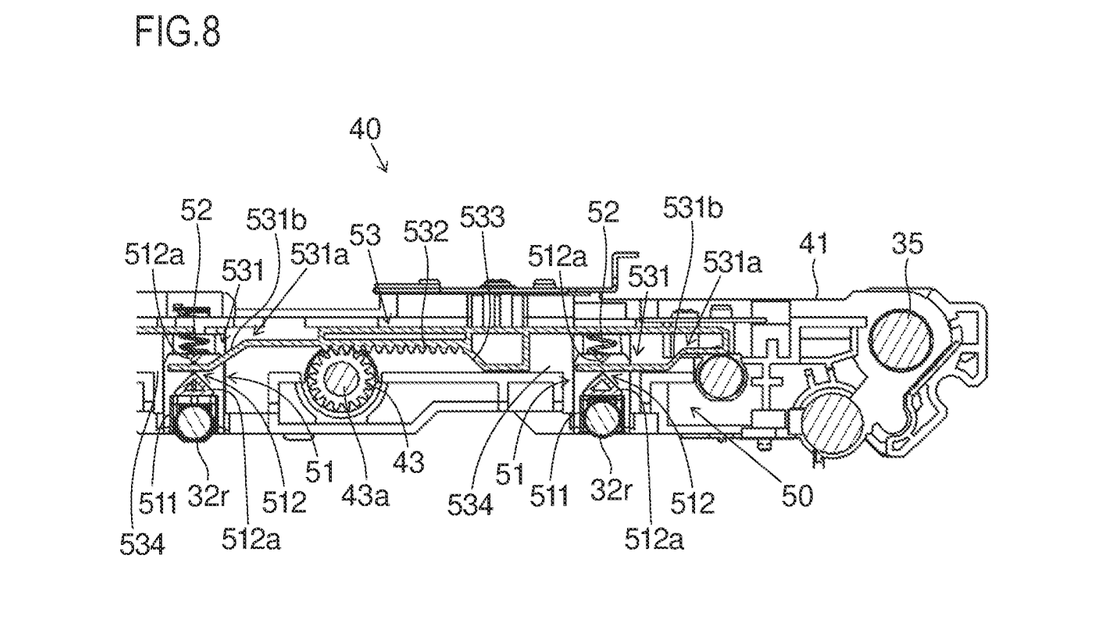
FIG. 8 is a sectional front part view of the belt conveyance device in FIG. 7, across a section of the slider.

The primary contact-release mechanism 50 is arranged near the primary transfer roller 32r. FIGS. 5 and 7 are sectional front part views of the belt conveyance device 40 in FIG. 2, showing a slider 53 in positions disengaged from and engaged with a bearing holder 51. FIGS. 6 and 8 are diagrams across a section of the slider 53 in FIGS. 5 and 7.

The primary contact-release mechanism 50 includes a pair of bearing holders 51, a pair of urging members 52, and a pair of sliders 53. The bearing holders 51, the urging members 52, and the sliders 53 are provided one each on each of the pair of side frames 41 arranged on the front and rear side faces of the belt conveyance device 40.

The pair of bearing holders 51 are arranged in a lower part of the pair of side frames 41. The bearing holder 51 is attached to the side frame 41 so as to be movable in the up-down direction, that is, the contact-release direction toward and away from the lower inner circumferential surface of the intermediate transfer belt 31. The side frame 41 has a guide portion (not illustrated) that movably supports the bearing holder 51 in the up-down direction.

The bearing holder 51 is arranged, for each of the four primary transfer roller 32r, at opposite end parts of the primary transfer roller 32r in the axial direction. The bearing holders 51 rotatably support the opposite end parts of the primary transfer roller 32r in the axial direction. The bearing holder 51 has a bearing recess 511 and a groove 512.

The bearing recess 511 is provided in a lower part of the bearing holder 51 and is open in the bottom face of the bearing holder 51 to be and recessed upward. The bearing recess 511 accommodates the primary transfer roller 32r. A lower part of the primary transfer roller 32r is exposed downward through the bottom face of the bearing recess 511 and the side frame 41 and makes contact with the lower inner circumferential surface of the intermediate transfer belt 31.

The groove 512 is provided in a top part of the bearing holder 51. Above and below the groove 512, a pair of V-shaped projections 512a are formed. The pair of V-shaped projections 512a are each formed in a V-shape as viewed from the axial direction of the primary transfer roller 32r so as to extend in the axial direction, and are arranged beside each other across a gap so that their vertices face each other in the up-down direction. The groove 512 is located between the pair of V-shaped projections 512a arranged beside each other in the up-down direction. In other words, the groove 512 is configured such that the vertices of the pair of V-shaped projections 512a are arranged beside each other across a gap in the vertical direction. The groove 512 is open in both left and right directions from the bearing holder 51. A rib portion of the slider 53, which will be described later, is fitted into and removed out of the groove 512.

The pair of urging members 52 are arranged above the pair of bearing holders 51 on the pair of side frames 41. The upper end of the urging member 52 makes contact with the side frame 41 and the lower end of the urging member 52 makes contact with the top face of the bearing holder 51. The urging member 52 is configured with, for example, a compression spring and urges the bearing holder 51 downward. That is, the urging member 52 urges the bearing holder 51 in such a direction that the primary transfer roller 32r supported on the bearing holder 51 moves toward the lower inner circumferential surface of the intermediate transfer belt 31.

The pair of sliders 53 are arranged in upper parts of the pair of the side frames 41, and are located above the bearing recesses 511 (the primary transfer roller 32r) in the pair of bearing holders 51. The slider 53 extends along the movement direction of the intermediate transfer belt 31, that is, the left-right, transverse direction in the image forming apparatus 1 in FIG. 1. The slider 53 is formed in the shape of a bar elongate from near the secondary transfer portion 33 to above the primary transfer portion 32Y for yellow, which is farthest from the secondary transfer portion 33.

The side frame 41 includes a slider guide portion (not illustrated) that supports the slider 53. The slider guide portion extends along the movement direction of the intermediate transfer belt 31 (the left-right, transverse direction in FIGS. 1 and 2), that is, the orthogonal direction orthogonal to the axial direction of the primary transfer roller 32r. Thus, the slider 53 is supported on the side frame 41 so as to be reciprocably movable along the movement direction of the intermediate transfer belt 31, that is, the orthogonal direction orthogonal to the axial direction of the primary transfer roller 32r (the left-right, transverse direction in FIGS. 1 and 2).

The slider 53 has a rib portion 531, a rack portion 532, and an inclined portion 533.

The rib portion 531 is arranged in a lower part of the slider 53. The slider 53 has four rib portions 531 corresponding to the four primary transfer rollers 32r respectively. The four rib portions 531 are arranged side by side in the orthogonal direction orthogonal to the axial direction of the primary transfer roller 32r (the left-right, transverse direction in FIG. 2) and are arranged adjacent to the bearing holders 51. The rib portion 531 stays fitted in the groove 512 in the bearing holder 51 during the operation of the image forming apparatus 1. The rib portion 531 has a step portion 531a.

The step portion 531a has steps at different positions (heights) in the up-down direction via a slope 531b arranged in a middle part of the slider 53 with respect to its movement direction (the left-right, transverse direction in FIG. 2). The step portion 531a is lower at the side closer to the driven roller 36 than the slope 531b to be close to the lower inner circumferential surface of the intermediate transfer belt 31, and is higher at the side closer to the driving roller 35 than the slope 531b to be upward away from the lower inner circumferential surface of the intermediate transfer belt 31.

That is, when, as the slider 53 moves, the bearing holder 51 is located closer to the driven roller 36 than the slope 531b, the bearing holder 51 moves close to the lower inner circumferential surface of the intermediate transfer belt 31. Thus, the primary transfer roller 32r moves close to and makes contact with the lower inner circumferential surface of the intermediate transfer belt 31. On the other hand, when, as the slider 53 moves, the bearing holder 51 is located closer to the driving roller 35 than the slope 531b, the bearing holder 51 moves away from the lower inner circumferential surface of the intermediate transfer belt 31 against the urging force of the urging member 52. Thus, the primary transfer roller 32r moves away from the inner circumferential surface of the intermediate transfer belt 31.

In this way, the slider 53 engages with the bearing holder 51 via the rib portion 531 and moves the bearing holder 51 in the contact-release direction in which the primary transfer roller 32r moves toward and away from the lower inner circumferential surface of the intermediate transfer belt 31.

The rack portion 532 is arranged in the lower part of the slider 53. The rack portion 532 is arranged, for example, between the two rib portions 531 in the movement direction of the slider 53. On the rack portion 532, a plurality of teeth are formed that are arranged in a row along the movement direction of the slider 53 and that face downward. The rack portion 532 meshes with the driving gear 43. The rack portion 532 is formed within the movable range of the slider 53 in the movement direction of the slider 53. Thus, the motive power received from the driving gear 43 can be transmitted effectively to the slider 53. This helps efficiently achieve the movement of the primary transfer roller 32r in the contact-release direction with respect to the lower inner circumferential surface of the intermediate transfer belt 31.

The inclined portions 533 are arranged at the opposite ends of the rack portion 532 in the movement direction of the slider 53. The inclined portion 533 inclines downward, where the driving gear 43 is located, as it extends away from the rack portion 532 in the movement direction of the slider 53. When the slider 53 moves to one end of the movable range close to the driving roller 35 or to the other end of the same range close to the driven roller 36, the tips of the teeth of the driving gear 43 make contact with the inclined portion 533 and the slider 53 stops. Thus, at the opposite ends of the movable range of the slider 53, it is possible to prevent the teeth of the rack portion 532 and the driving gear 43, which mesh with each other, from being subjected to a large load.

The driving gear 43 is arranged below the slider 53, for example, between two primary transfer rollers 32r in the movement direction of the slider 53. The driving gear 43 is fixed to a shaft 43a. The shaft 43a extends parallel to the axial direction of the plurality of stretching rollers and its opposite ends in the axial direction are rotatably supported on the pair of side frames 41. That is, the driving gear 43 is rotatable about an axis extending parallel to the primary transfer roller 32r.

The driving gear 43 receives motive power from a driving source (not illustrated) for the belt conveyance device 40 and rotates in both forward and reverse directions. The driving gear 43 rotating in both forward and reverse directions enables the slider 53 to move reciprocably along the movement direction of the intermediate transfer belt 31 (the left-right, transverse direction in FIG. 2), that is, the orthogonal direction orthogonal to the axial direction of the primary transfer roller 32r.

Moving the slider 53 reciprocably along the movement direction of the intermediate transfer belt 31 makes the rib portion 531 move the bearing holder 51 toward and away from the lower inner circumferential surface of the intermediate transfer belt 31. The primary contact-release mechanism 50 moves the bearing holder 51 between a contact state in which the bearing holder 51 is located close to the lower inner circumferential surface of the intermediate transfer belt 31 and in which the primary transfer roller 32r is in contact with the lower inner circumferential surface of the intermediate transfer belt 31, and a released state in which the bearing holder 51 is away from the lower inner circumferential surface of the intermediate transfer belt 31 and in which the primary transfer roller 32r is away from the lower inner circumferential surface of the intermediate transfer belt 31. That is, the primary contact-release mechanism 50 switches the plurality of primary transfer rollers 32r between the contact state and the released state with respect to the lower inner circumferential surface of the intermediate transfer belt 31.

Next, a method of assembling the belt conveyance device 40 will be described with reference to FIGS. 5 to 8. The driven roller 36 mentioned in the following description is located outside, to the left of, the figure in FIGS. 5 to 8 (see FIG. 2).

In connection with the assembling of the belt conveyance device 40, the slider 53 has an opening portion 534. The opening portion 534 is arranged closer to the driven roller 36 than an end part of the rib portion 531 that is close to the driven roller 36 with respect to the movement direction of the slider 53 (the left-right, transverse direction in FIGS. 6 and 8). In terms of FIGS. 6 and 8, the opening portion 534 is arranged to the left of a left side end part of the rib portion 531. The opening portion 534 opens downward into the internal space of the slider 53 located above the rib portion 531.

When the assembling of the belt conveyance device 40 is complete, the upper V-shaped projection 512*a* with respect to the groove 512 in the bearing holder 51 is located in the internal space of the slider 53 (see FIG. 8). In this state, with the rib portion 531 inserted in the groove 512 in the bearing holder 51, the slider 53 is arranged in an engaged position where it is engaged with the bearing holder 51.

In the process of assembling the belt conveyance device 40, the upper V-shaped projection 512*a*, with respect to the groove 512, in the bearing holder 51 can be inserted into the internal space of the slider 53 from below through the opening portion 534. In this state, with the bearing holder 51 located at the position of the opening portion 534, the slider 53 is arranged in a disengaged position where it is disengaged from the bearing holder 51.

Thus, during the assembling of the belt conveyance device 40, the slider 53 is arranged selectively in the engaged position where it is engaged with the bearing holder 51 or in the disengaged position where it is disengaged from the bearing holder 51.

FIGS. 5 and 6 show a middle stage during the assembling of the belt conveyance device 40, and so the driving gear 43 and the shaft 43*a* are not attached to the side frame 41. In a state without the driving gear 43 mounted to the side frame 41, the slider 53 is arranged on the side frame 41. In this state, the slider 53 is arranged in the disengaged position where it is disengaged from the bearing holder 51.

Next, the bearing holder 51 and the urging member 52 are attached to the side frame 41. In this state, the slider 53 is arranged in the position disengaged from the bearing holder 51 and through the opening portion 534 in the slider 53, the upper V-shaped projection 512*a*, with respect to the groove 512, in the bearing holder 51 is inserted into the internal space of the slider 53.

Then, the slider 53 is moved to the position engaged with the bearing holder 51 (see FIGS. 7 and 8). In terms of FIGS. 7 and 8, the slider 53 is moved to the left side (the driven roller 36 side). In this state, the rib portion 531 is inserted into the groove 512 in the bearing holder 51 so that the slider 53 is engaged with the bearing holder 51. After that, the slider 53 is moved further to arrange the driving gear 43 within the movable range of the slider 53 (within the range of the rack portion 532).

Next, the driving gear 43 and the shaft 43*a* are attached on the side frame 41 to mesh with the rack portion 532 of the slider 53 arranged in the engaged position.

With the configuration described above, when the driving gear 43 is attached to the side frame 41, the bearing holder 51 is arranged in the engaged position where it is engaged with the slider 53. That is, when the attachment of the slider 53 and the driving gear 43 to the side frame 41 is complete, the bearing holder 51 is kept engaged with the slider 53 and is prevented from falling off the side frame 41 accidentally. During the assembling of the belt conveyance device 40, this helps prevent the bearing holder 51 attached to the side frame 41 from falling off easily in the process of assembling.

Moreover, when other components are fitted after the slider 53 is attached to the side frame 41, there is no need for work and jigs to hold the bearing holder 51 so that it may not fall off the side frame 41. This helps ease assembly and reduce the cost of the production facility.

Owing to the slider 53 having the rib portion 531 and the bearing holder 51 having the groove 512, simply moving the slider 53 along the direction in which the slider 53 moves during operation, it is possible to arrange the slider 53 selectively in the engaged or disengaged position with respect to the bearing holder 51. It is thus possible, with a low-cost, simple configuration, to prevent the bearing holder 51 attached to the side frame 41 from falling off easily in the process of assembling.

The embodiment of the present disclosure described above is not meant to limit the scope of the disclosure, which can thus be implemented with various modifications made without departing from the spirit of the present disclosure.

For example, in the embodiment described above, the belt conveyance device 40 includes the intermediate transfer belt 31 to which the toner images formed in the four image forming portions 20 are transferred sequentially while being overlaid on each other, but this is not meant as any limitation to such an apparatus. The present disclosure can be applied to, for example, a belt conveyance device including a conveyance belt that conveys a recording medium to which an image is recorded by an image forming portion. Thus, the belt conveyance device can prevent a bearing holder attached to a side frame from falling off easily in the process of assembling.

While, in the above embodiment, the image forming apparatus 1 is assumed to be what is called a tandem-type image forming apparatus for color printing, this is not meant as any limitation to particular models. The image forming apparatus may be any color-printing image forming apparatus other than of a tandem type, so long as it includes an intermediate transfer belt.

What is claimed is:

1. A method of assembling a belt conveyance apparatus including:
   an endless belt;
   a plurality of rollers including a stretching roller around which the belt is rotatably stretched;
   a frame that rotatably supports the plurality of rollers;
   a bearing holder provided on the frame, the bearing holder rotatably supporting at least one of the plurality of rollers, the bearing holder being movable in a contact-release direction toward and away from an inner circumferential surface of the belt;
   an urging member that urges the bearing holder in such a direction that the at least one roller supported on the bearing holder moves toward the inner circumferential surface of the belt;
   a slider that is supported on the frame so as to be reciprocably movable along an orthogonal direction orthogonal to an axial direction of the roller, the slider engaging with the bearing holder to move the bearing holder in the contact-release direction; and
   a driving gear that is rotatably supported on the frame, the driving gear meshing with the slider to make the slider move reciprocably,
   the slider being arranged selectively in a disengaged position where the slider is disengaged from the bearing holder or in an engaged position where the slider is engaged with the bearing holder, the method comprising;
- a step of, in a state without the driving gear attached to the frame, arranging the slider in the disengaged position;
- a step of attaching the bearing holder and the urging member to the frame;
- a step of moving the slider to the engaged position so that the slider engages with the bearing holder; and
- a step of attaching the driving gear to the frame so that the driving gear meshes with the slider arranged in the engaged position.

2. The method according to claim 1, wherein
the slider has
- a rack portion formed within a movable range of the slider in the orthogonal direction, the rack portion meshing with the driving gear; and
- a rib portion extending along the orthogonal direction, the rib portion being engaged with and disengaged from the bearing holder, and the bearing holder has a groove engaged with and disengaged from the slider as a result of the rib portion being fitted into and removed out of the groove.

3. The method according to claim 2, wherein
the slider has an inclined portion arranged one at each of opposite ends of the rack portion in the orthogonal direction, each inclined portion being inclined in the orthogonal direction.

4. The method according to claim 1, wherein
the belt is an intermediate transfer belt that moves along an array direction of a plurality of image carrying members, the plurality of rollers are arranged opposite the plurality of image carrying members across the intermediate transfer belt, the plurality of rollers including a plurality of primary transfer rollers that transfer, to the intermediate transfer belt, toner images formed on respective outer circumferential surfaces of the plurality of image carrying members while sequentially overlaying the toner images on each other, and the plurality of primary transfer rollers are supported on the bearing holder.

* * * * *